Patented Apr. 8, 1930

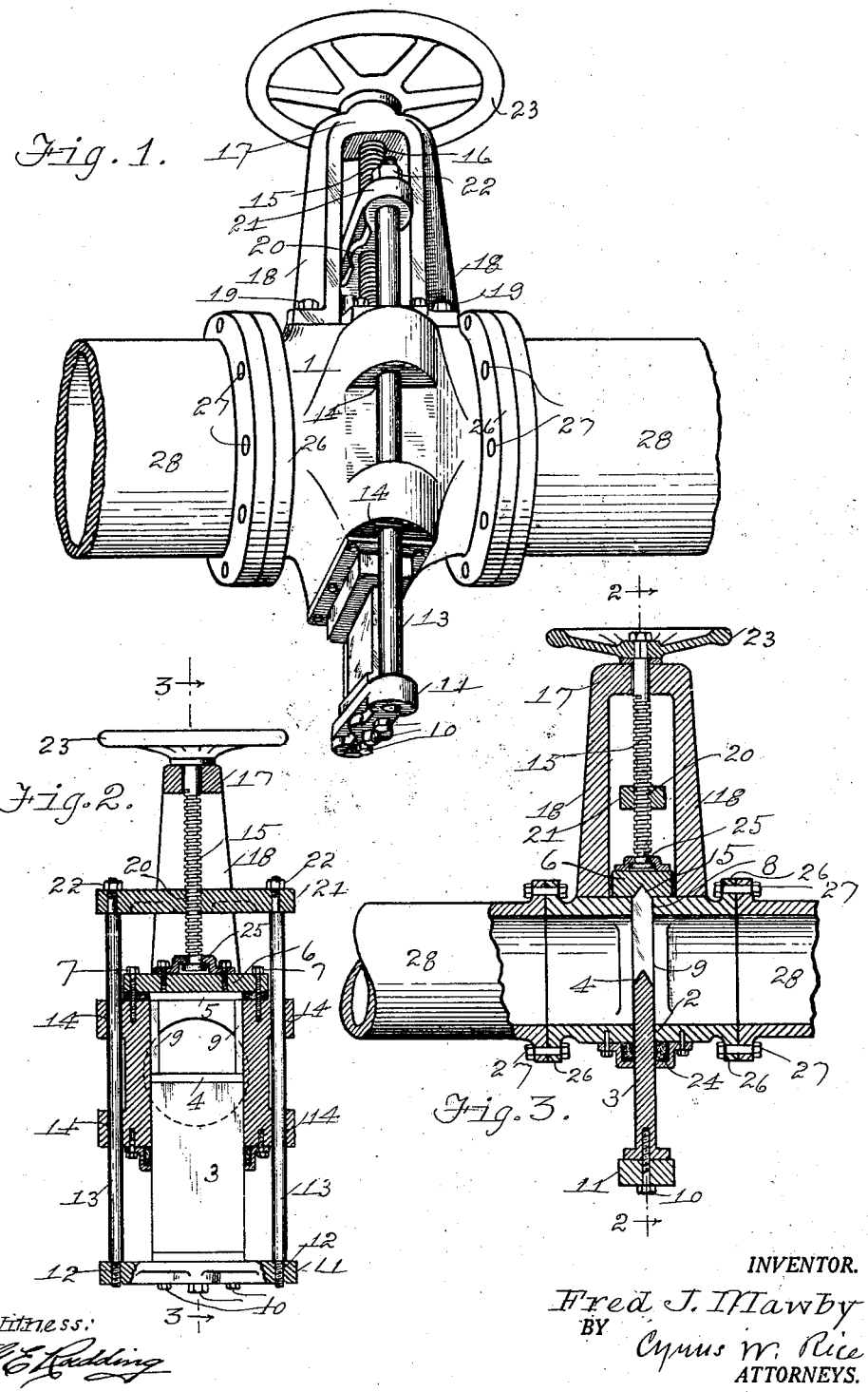

1,753,524

UNITED STATES PATENT OFFICE

FRED J. MAWBY, OF HAYS TOWNSHIP, CHARLEVOIX COUNTY, MICHIGAN

VALVE

Application filed September 1, 1926. Serial No. 132,943.

The present invention relates to valves; and its object is, generally, to provide a gate valve improved in various respects hereinafter appearing; and more particularly, to provide improved means for mounting and for operating such a valve; and further, to provide improved means for preventing solid matter from collecting in the passage controlled by such a valve; and further, to provide improved features of construction in a valve of this character.

These objects are attained by, and the invention finds preferable embodiment in, the valve structure hereinafter particularly described in the body of this specification and illustrated by the accompanying drawings, in which:—

Figure 1 is a view in perspective of a valve structure;

Figure 2 is a transverse sectional view thereof taken on line 2—2 of Figure 3; and Figure 3 is a longitudinal sectional view of the same taken on line 3—3 of Figure 2.

In the structure illustrated by the accompanying drawings, the cross-sectionally round pipe 1 has an opening 2 through its lower side. This opening is in form a slot elongated in the pipe's transverse direction, wherein slidably bears the vertically movable gate valve 3, open in its lowered position and closed in its raised position. This valve seats at its upper end 4, which is desirably cross-sectionally bevelled as shown, in a correspondingly shaped valve seat 5 formed in the pipe's upper side, or (as shown) in the member 6 secured as by screw bolts 7 to the pipe and closing the outer or upper end of an opening 8, which in this construction extends through the upper side of the pipe and is aligned with the opening 2 through its lower side. In its opening and closing movement the side edges of the valve are guided in vertical grooves 9 formed in the inner surface of the pipe as shown. The outer (lower) end of the valve is connected as by screw bolts 10 to a horizontal cross bar 11 whose ends receive at 12 the threaded lower ends of a pair of parallel rods 13 extending vertically on the opposite sides of the pipe and being slidable in the bearings 14 formed on the pipe.

Various means may manifestly be employed for moving these rods vertically to open and close the valve. Such means shown in the views comprise a screw 15 journalled at 16 in a post 17, whose portions or legs 18, spaced apart in the pipe's longitudinal direction, are carried on the upper side of the pipe and secured thereto by screw bolts 19, the screw's journal 16 being between the portions or legs 18. This screw is threaded at 20 in the middle of a cross bar 21, secured to the threaded upper ends of the rods 13 by nuts 22. The screw may be turned as by its hand wheel 23. Packing is shown at 24, and a bearing 25 is provided for the lower end of the screw 15, said bearing being between the post's portions 18. The pipe 1 is shown as having flanges 26 whereby it may be connected as by screw bolts 27 to the pipe extensions 28 at either end.

It will be seen that the valve being guided in the opening 2 and in the grooves 9, and the rods 13 outside the pipe being guided in the bearings 14, a very substantial slidable mounting of the valve is provided; and that the portions or legs 18 of the post 17 being spaced apart in the pipe's longitudinal direction, a stable positioning of the operating screw is brought about; and that inasmuch as the valve seat 5 is in the upper side of the pipe, solid matter cannot fall thereinto to obstruct the perfect seating of the closed valve.

The invention being intended to be pointed out in the claims, is not to be limited to or by details of construction of the particular embodiment thereof illustrated by the drawings or hereinbefore described.

I claim:

1. In a device of the class described, a pipe having transversely disposed slots at opposite sides thereof in alignment with each other, a valve seat member detachably mounted on the outside of said pipe in position to close one of said slots, a gate valve slidable in the other of said slots adapted to close against said valve seat, a screw swivelly bearing against the outer side of said seat member, and connections threadedly engaged by said screw for actuating said gate valve.

2. In a device of the class described, a pipe having transversely disposed slots at opposite sides thereof in alignment with each other, a valve seat member detachably mounted on the outside of said pipe in position to close one of said slots, a gate valve slidable in the other of said slots adapted to close against said valve seat, a screw swivelly bearing against the outer side of said seat member, bearings at opposite sides of said pipe disposed parallel to said gate valve, rods slidable in said bearings, a cross head on one end of said rods for supporting said gate valve, and a cross head on the other end of said rods threadably engaging said screw whereby rotation of said screw will slide said gate valve.

In testimony whereof I have hereunto set my hand at Charlevoix, State of Michigan, this 27th day of August, 1926.

FRED J. MAWBY.